(12) United States Patent
Jacobsohn et al.

(10) Patent No.: US 8,046,006 B2
(45) Date of Patent: Oct. 25, 2011

(54) METHOD FOR CARRYING OUT PAGING IN A CELLULAR MOBILE COMMUNICATION SYSTEM

(75) Inventors: Dieter Jacobsohn, Bonn (DE);
Karl-Heinz Nenner, Bornheim (DE)

(73) Assignee: T-Mobile International AG & Co. KG, Bonn (DE)

( * ) Notice: Subject to any disclaimer, the term of this patent is extended or adjusted under 35 U.S.C. 154(b) by 425 days.

(21) Appl. No.: 12/279,048

(22) PCT Filed: Feb. 9, 2007

(86) PCT No.: PCT/EP2007/001104
§ 371 (c)(1),
(2), (4) Date: Feb. 5, 2009

(87) PCT Pub. No.: WO2007/090657
PCT Pub. Date: Aug. 16, 2007

(65) Prior Publication Data
US 2009/0221306 A1    Sep. 3, 2009

(30) Foreign Application Priority Data
Feb. 10, 2006  (DE) .......................... 10 2006 006 485

(51) Int. Cl.
*H04W 68/00*   (2009.01)
(52) U.S. Cl. ...... 455/458; 455/436; 455/437; 455/426.1

(58) Field of Classification Search ................... 455/458, 455/436, 426.1, 437
See application file for complete search history.

(56) References Cited

U.S. PATENT DOCUMENTS

2004/0071112 A1* 4/2004 Hsu et al. ........................ 370/331
2006/0083212 A1* 4/2006 Colban et al. ................. 370/349

OTHER PUBLICATIONS

Perkins C E et al: "Optimized Smooth Handoffs in Mobile IP" Proceedings IEEE International Symposium on Computers and Communications, Jul. 6, 1999, Seiten 340-346, XP002902009.
Stefano M Faccin, Rajeev Koodli, Franck Le, Jari T. Malinen, Rene, Purnadi: "Dormant Mode Handover Support in Mobile Networks" IETF Standard-Working-Draft, Internet Engineering Task Force, IETF, CH, Nr. 1, Nov. 2001, XP015031155 ISSN: 0000-0004.

* cited by examiner

*Primary Examiner* — Barry Taylor
(74) *Attorney, Agent, or Firm* — Browdy and Neimark, PLLC

(57) ABSTRACT

The invention relates to a method for carrying out paging in a cellular mobile communication system. A terminal is operated in a first radio cell of the mobile communication system which is in an idle state, data is provided in a data transmission device of the mobile communication system for transmission to the terminal. According to the invention, the information is first transmitted to a radio transmission device supplying the first radio cell with radio signals, whereupon a paging is carried out or initiated by the radio transmission device in order to activate the terminal and to be able to transmit the data.

5 Claims, 2 Drawing Sheets

METHOD FOR CARRYING OUT PAGING IN A CELLULAR MOBILE COMMUNICATION SYSTEM

The invention relates to a method for carrying out paging in a cellular mobile communication system. The paging is carried out by the mobile communication system for the purpose of determining the location of a mobile communication user equipment unit.

Figure 1:
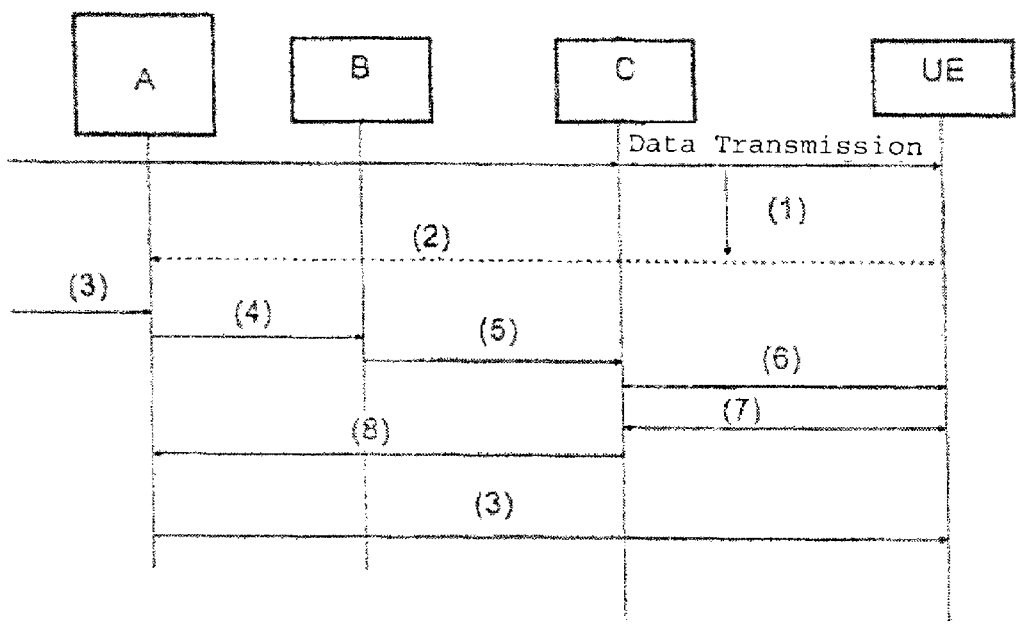

Method Currently being Used, FIG. 1:

A mobile user equipment unit (user equipment, UE) is located in a radio cell of a mobile communication system and is reachable for data to be transmitted. If no data transmission takes place for some time the user equipment unit UE is put into an idle state (idle), in which a data transmission is no longer possible, (1). The idle state is signaled to the mobile communication network, (2). While in the idle state, the user equipment units UEs can change their location, and thus also the preferred radio cell (serving cell), without information to this effect being sent to the communication network.

In order to again be able to transmit data to this user equipment unit UE, the user equipment unit UE must be brought from the idle state into an active state. The current serving cell, in particular, must also be determined, i.e., the radio cell in whose service area the user equipment unit is located. This is done by using a paging mechanism.

In the known solution this paging is carried out as shown in FIG. 1.

If the user equipment unit UE is in the idle state, and at a data transmission device A of the communication network new data is waiting to be transmitted to the user equipment unit, (3), the data transmission device A initiates a paging request within a specified paging area, a so-called area paging request, to a mobility control device B, (4). The paging area encompasses a certain (presumed) location area of the user equipment unit, but it can also be expanded to the entire mobile communication network. The mobility control device B, in turn, initiates radio-cell specific paging requests, so-called cell paging requests, to all of its assigned radio transmission devices C in the paging area, (5). The radio transmission devices C each initiate a radio paging message, a so-called radio paging, that can be received by all user equipment units UE located within their range, (6). The user equipment unit UE addressed in the radio paging reports to the radio transmission device C that is currently the preferred radio cell, the serving cell, during which process the radio transmission device C assigns to the user equipment unit certain radio transmission resources in the form of a resource assignment, (7). The radio transmission device C reports the location of the user equipment unit UE to the data transmission device A by means of a message in the form of a cell paging response (8). The new data can now be transmitted from the data transmission device A to the user equipment unit UE, (9).

Examples for known data transmission devices are Serving GPRS Support Node SGSN, User Plane Entity UPE, and Packet Data Gateway PDG. Examples for known mobility control devices are Mobility Management Entity MME, and Serving GPRS Support Node, for example.

It is the object of the invention to simplify the above-described paging method and to render it more effective.

This object is met according to the invention with a method for carrying out paging in a cellular mobile communication system, wherein a user equipment unit (UE), which is in an idle state, is operated in a first radio cell of the mobile communication system, wherein data, which is to be transmitted to the user equipment unit, is waiting to be transmitted in a data transmission device (A) of the mobile communication system, comprising transmitting the data directly to a radio transmission device ($C_{alt}$) supplying the first radio cell with radio signals, and sending a paging to the user equipment unit (UE) by the radio transmission device ($C_{alt}$).

Preferred embodiments of the invention as well as further advantageous features of the invention are specified in the subclaims.

At the time a paging is carried out in a cellular mobile communication system, a user equipment unit, which is in an idle state, is operated in a first radio cell of a mobile communication system while data, which is to be transmitted to the user equipment unit, is waiting to be transmitted in a data transmission device of the mobile communication system.

The method is characterized in that the data is initially transmitted directly to a radio transmission device supplying the first radio cell with radio signals, and a paging of the user equipment unit is carried out and/or initiated by the radio transmission device.

Depending on whether or not the user equipment unit remains in the present radio cell while in the idle state, the data can either be transmitted from the radio transmission device directly to the user equipment unit, or a paging in other radio cells must be initiated by the radio transmission device, so that the data can be transmitted from the data transmission device via another radio transmission device to the user equipment unit.

The inventive method incorporates an alternative proposal for the paging process in a mobile radio system. By minimizing the necessary signaling, a faster connection establishment and greater efficiency in the network are attained.

FIG. 1 describes the signaling in a prior-art paging method that has been used until now.

Figure 2:
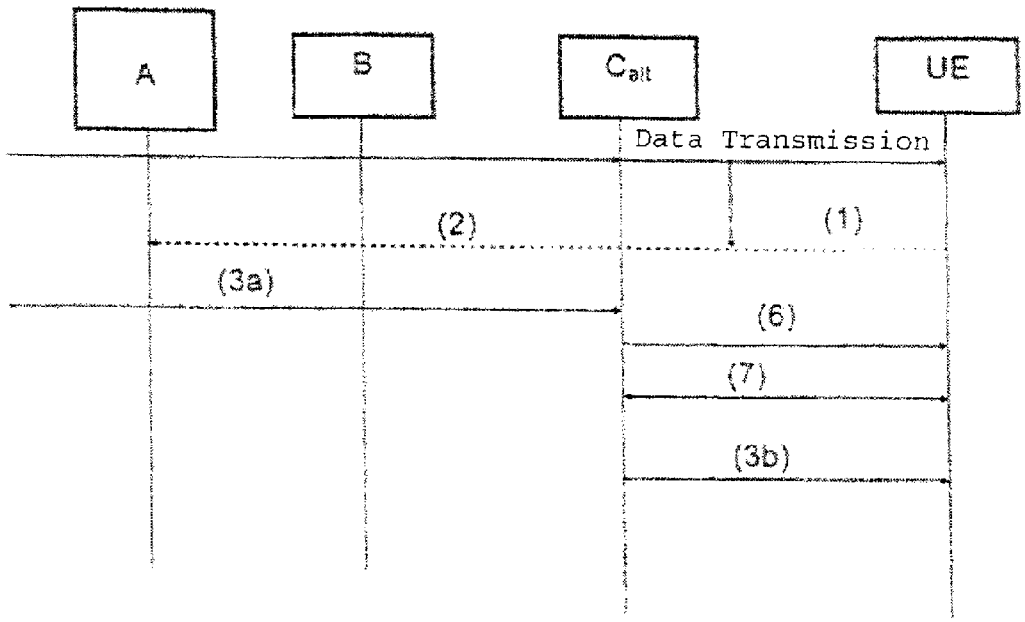

FIG. 2 describes the signaling according to a first embodiment of the inventive paging method.

Figure 3:
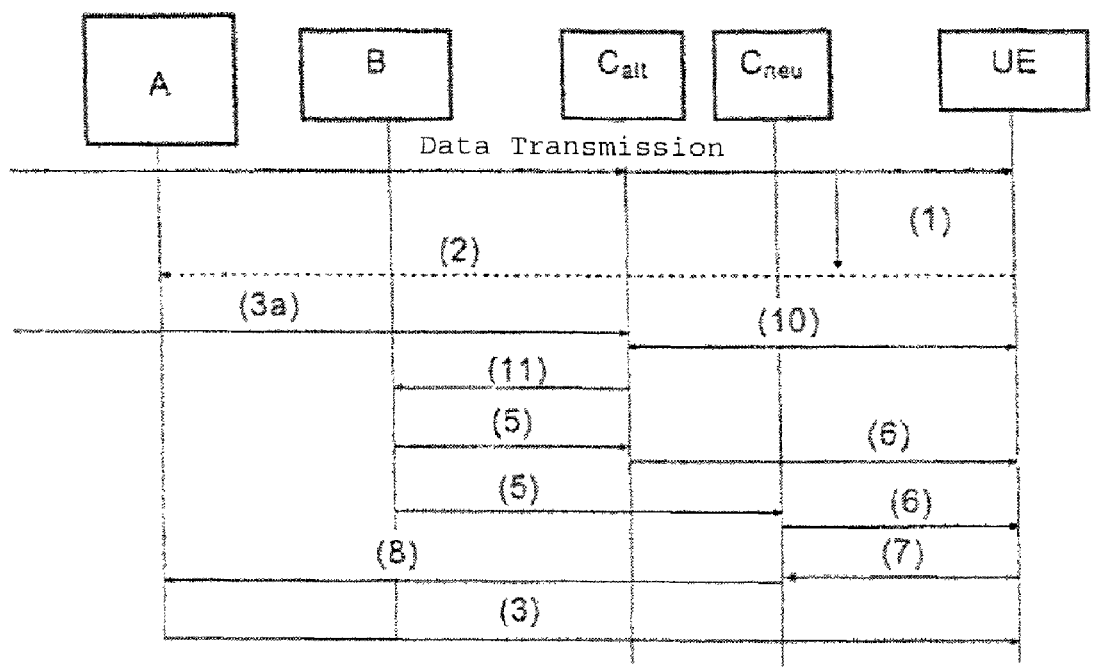

FIG. 3 describes the signaling according to a second embodiment of the inventive paging method.

The initial state is identical to that of the known solution described in conjunction with FIG. 1. A user equipment unit (user equipment, UE) is located within a radio cell, also referred to as "the same" radio cell or "first" radio cell, and is reachable for data to be transmitted. Due to an inactivity of data transmission the user equipment unit UE is put into an idle state (idle), in which data transmission is no longer possible and the user equipment unit can change its serving cell without notifying the network, (1). In order to again be able to send data to this user equipment unit UE, the user equipment unit UE must be brought into an active state and the current preferred radio cell, the serving cell, must be determined. This is done by using a paging mechanism.

FIG. 2 shows the inventively optimized solution for the case that the user equipment unit UE is still located in the same serving cell as before the idle state.

Since the data transmission device A assumes that the user equipment unit is still located in the same radio cell, it attempts—in contrast to the previously known solution—to continue to send data to the user equipment unit UE via the last known radio transmission device $C_{alt}$, i.e. the radio cell that was the current serving cell when the switch to the idle state took place, (3a). Since, due to the idle state of the user equipment unit UE, a direct data transmission is not possible on the part of the radio transmission device $C_{alt}$, the radio transmission device $C_{alt}$ initiates a radio paging, (6). The user equipment unit UE is still reachable in the same radio cell and the corresponding radio transmission resources can again be assigned, (7)—now the data can be transmitted from the radio transmission device $C_{alt}$ to the user equipment unit UE, (3b).

An area paging request to the mobility control device B and subsequent cell paging in all radio cells of the area are no longer necessary according to the invention. This minimizes the necessary signaling traffic and permits a faster connection establishment and greater effectiveness in the network.

FIG. 3 shows the inventively optimized solution for the case that the user equipment unit UE is no longer located in the same "first" serving cell as before the idle state, but in another, "second" or "new" serving cell.

Here too, the data transmission device A assumes that the user equipment unit is still located in the same radio cell and supplied with radio signals by the previous "old" radio transmission device $C_{alt}$. The data transmission device attempts to send data via the "old" radio transmission device $C_{alt}$ to the user equipment unit UE, (3a). The "old" radio transmission device $C_{alt}$ initiates a radio paging, which is unsuccessful, since the user equipment unit is no longer located in the previous radio cell, (10). Based on the unsuccessful radio paging, and/or other decision criteria without radio paging, e.g. expiration of a timer, the "old" radio transmission device $C_{alt}$ determines that the user equipment unit UE is no longer reachable in its "old" assigned radio cell and that an area paging request and a cell paging request is necessary. To initiate the paging process, the "old" radio transmission device $C_{alt}$ now transmits an area paging request directly, i.e., without detour via the data transmission device A, to the mobility control device B, (11). The mobility control device subsequently properly transmits a paging message in the form of a cell paging request to all radio transmission devices $C_{neu}$, $C_{alt}$, etc. belonging to the paging area, (5). The radio transmission devices $C_{neu}$, $C_{alt}$, initiate a radio paging that can be received by all user equipment units UE located in their respective ranges, (6). The user equipment unit UE addressed in the radio paging, which is located in the area of the "new" radio transmission device $C_{neu}$, reports to the "new" radio transmission device $C_{neu}$ that represents the current serving cell. A radio resource assignment to the user equipment unit takes place, (7), and the radio transmission device $C_{neu}$ reports to the data transmission device A the location of the user equipment unit UE, (8). New data can now be transmitted from the data transmission device A via the "new" radio transmission device to the user equipment unit UE, (9).

What is novel is that the area paging request is directed from the "old" radio transmission device $C_{alt}$ directly to the mobility control device B if the determination is made that the user equipment unit is not reachable in the radio cell of the "old" radio transmission device $C_{alt}$. This saves the detour via the data transmission device for the signaling process.

In dependence upon the above-mentioned decision criteria of the radio transmission device $C_{alt}$ regarding the reachability of a user equipment unit UE, a (possibly renewed) paging in this radio transmission device $C_{alt}$ can be avoided if it has been determined that the user equipment unit is not reachable in the radio cell that is assigned to this radio transmission device $C_{alt}$. This means that the cell paging request (5) and the associated radio paging in the area of the "old" radio transmission device is not carried out repeatedly, since it was already determined earlier in process step (10) that the user equipment unit is not located within the area of this radio transmission device. Additionally, a data loss of data that was already transmitted to the "old" radio transmission device $C_{alt}$ can be prevented if data that accrues for transmission during the paging procedure is stored temporarily in the "old" radio transmission device $C_{alt}$, for instance with the aid of corresponding functions implemented for handover, and transmitted to the "new" radio transmission device $C_{neu}$ after resumption of the data transmission.

LIST OF REFERENCE NUMERALS

A Data transmission device
B Mobility control device
C Radio transmission device
$C_{alt}$ Previously used "old" radio transmission device
$C_{neu}$ "New" radio transmission device
UE User equipment unit
Process Steps Shown in the Drawings
(1) User equipment unit UE goes into idle state
(2) Signaling of idle state to the network components C, B, A
(3) Transmission of new data for UE to A
(3a) Transmission of new data for UE directly to C
(3) Transmission of new data from C to UE
(4) Area paging request from A to B
(5) Cell paging request from B to one or more C in the radio cells of the paging area
(6) Radio paging from C to UE
(7) Radio resource assignment C<->UE
(8) Transmission of the location of the UE from C to B and A by means of a cell paging response
(9) Transmission of the new data from A to UE
(10) Paging of UE by $C_{alt}$ unsuccessful
(11) Area paging request from $C_{alt}$ to B

What is claimed is:

1. A method for carrying out paging in a cellular mobile communication system, wherein a user equipment unit (UE), which is in an idle state, is operated in a first radio cell of the mobile communication system, wherein data, which is to be transmitted to the user equipment unit, is waiting to be transmitted in a data transmission device (A) of the mobile communication system, comprising transmitting the data directly to a first radio transmission device ($C_{alt}$) supplying the first radio cell with radio signals, and sending a paging message to the user equipment unit (UE) solely by the radio transmission device ($C_{alt}$), and
  upon receipt of the paging message, changing the user equipment unit from the idle state to an active state, in order to receive the data from the radio transmission device ($C_{alt}$),
  wherein if the user equipment unit (UE) has moved during its idle state from a first radio cell to a second radio cell, and the first radio transmission device ($C_{alt}$) of the first radio cell has transmitted the paging message to the user equipment unit, but the user equipment is unreachable, the first radio transmission device in the case of unreachability of the user equipment transmits a paging request to a mobility control device (B), whereupon the mobility control device (B) transmits a paging request to all radio transmission devices ($C_{alt}$, $C_{neu}$) of a specified paging area, whereupon the corresponding radio transmission devices ($C_{alt}$, $C_{neu}$) transmit a paging message to the user equipment unit, whereupon the user equipment unit upon receipt of the paging message switches from the idle state to an active state, in order to receive the information from the data transmission device (A) via a second radio transmission device ($C_{neu}$) serving the second radio cell.

2. A method according to claim 1, wherein in the case of the unreachability of the user equipment unit ($C_{alt}$, $C_{neu}$) in a radio cell, a transmission of a renewed paging message to the radio transmission device ($C_{alt}$) serving the radio cell no longer takes place.

3. A method according to claim 1 or 2, wherein the data already transmitted to the radio transmission device ($C_{alt}$) during the paging procedure is stored temporarily and transmitted to the second radio transmission device ($C_{neu}$) after resumption of the data transmission.

4. A paging system in a cellular mobile communication system with devices for carrying out the method as set forth in claim 1.

5. A paging system according to claim 4, comprising a mobility control device (B).

* * * * *